July 21, 1964 H. J. SAMUEL 3,141,551
EXTRUSION PRESS WITH ROTARY DIE-HOLDER CARRIER
Filed April 2, 1962
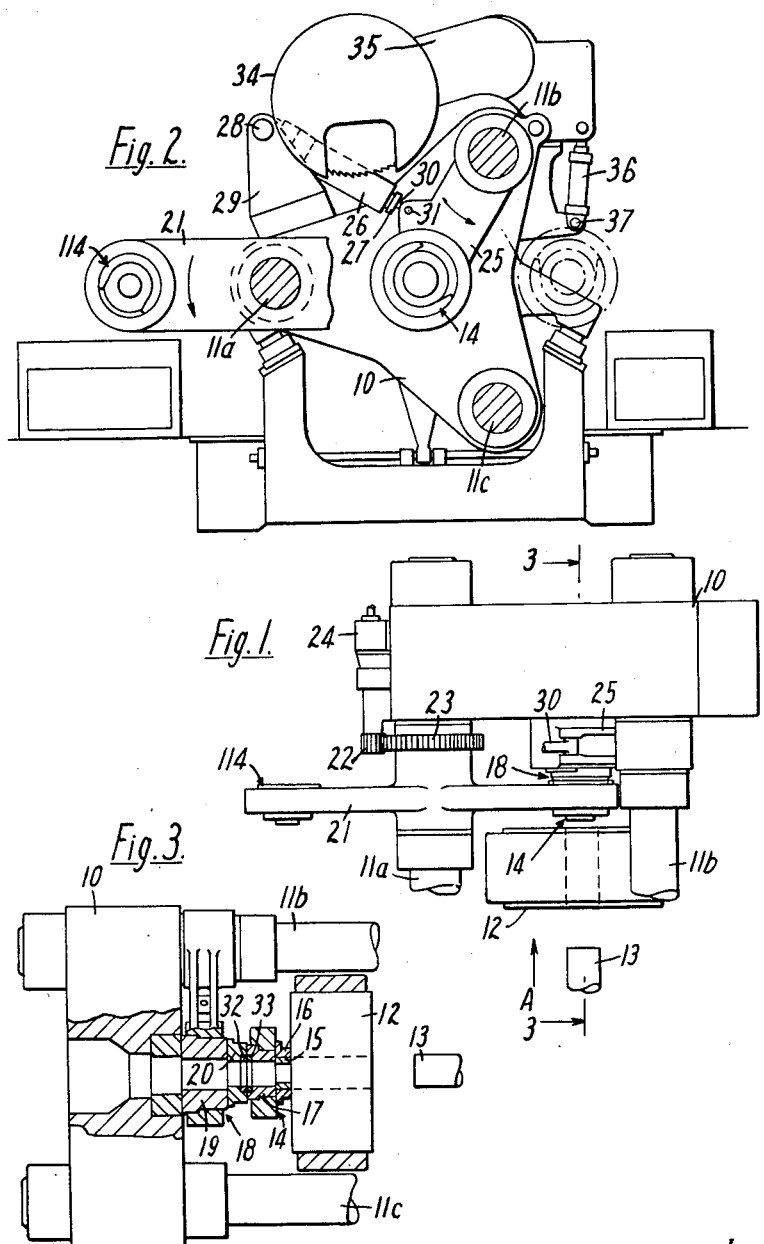
Inventor
HERBERT JOHN SAMUEL
By Hammond and Littell
Attorneys

United States Patent Office 3,141,551
Patented July 21, 1964

3,141,551
EXTRUSION PRESS WITH ROTARY
DIE-HOLDER CARRIER
Herbert John Samuel, Northbourne, Bournemouth, England, assignor to The Loewy Engineering Company Limited, Bournemouth, England, a corporation of Great Britain
Filed Apr. 2, 1962, Ser. No. 184,169
6 Claims. (Cl. 207—1)

This invention relates to extrusion presses in which a die-assembly is mounted on a rotary carrier. By rotating the carrier about an axis parallel to the main longitudinal axis of the press, the die-assembly can be moved from a position in the press axis to one at some distance away from this axis. In the latter position, the die and other parts of the die assembly are on the outside of the press and therefore readily accessible for any work to be done on them, such as reconditioning or exchanging. If two die assemblies are mounted on the same rotary carrier, they can be so arranged relative to each other that one assembly is on the outside of the press while the other is on the press axis. Die and die components of one assembly can then be reconditioned or exchanged while extrusion through the other die-assembly is in progress.

Die-assemblies for extrusion presses frequently comprise one or more annular bolsters arranged behind the die or its holder and which transmit pressure from the die to parts of the press frame at the rear of the die, such as the platen of the press. It has already been proposed to arrange a die-assembly and its bolster-assembly on two sepaarte rotary carriers which are rotatable about the same axis. This makes it necessary to mount one carrier on a hollow shaft which can be telescoped over a solid shaft on which the other carrier is rotatably mounted. The arrangement of telescopic shafts for the mounting of die-carriers has disadvantages, especially in presses operated with glass powder as a lubricant and where there is consequently a risk of abrasive matter being deposited on the surfaces of the press. Another drawback is that the outside positions for both carriers are on the same side of the press and so close to each other that exchange and handling of the bolsters must be effected at the same place as exchange and handling of the dies.

The metal extrusion press according to the present invention is of the type in which two separate rotary carriers are provided for a die assembly and its bolster, the two carriers being rotatable in planes perpendicular to the main longitudinal axis of the press. The novelty is seen in that both carriers are mounted for rotation about separate and spaced apart axes. There is, therefore, no need to provide telescopic shafts. Furthermore, the outside stations of both carriers can be located at opposite sides of the press.

Preferably, both carriers have separate and independently operable rotary drives which make it possible to rotate only one of the carriers, leaving the other one stationary, whereby the operation of both carriers is rendered more flexible. Rotation of the bolster carrier is usually less frequently required than that of the die carrier.

One carrier may support the die assembly and the other the bolster assembly. Alternatively, the carrier which supports the die assembly may also support part of the bolster assembly.

The die carrier is preferably slidable relative to the bolster carrier in a direction parallel to the main longitudinal press axis, to make it possible to enter a saw or shear between the two carriers for discard-separating purposes.

Alternatively and according to a further feature of the invention, both rotary carriers are provided with co-operating shearing edges at or near openings through which the extruded article passes. These edges become operative and can be used for separating the discard from the extruded article by rotating one carrier relative to the other.

The invention is capable of various embodiments. In one form the carriers are always rotated in the same direction and describe full circles during an extrusion cycle. In another embodiment, the carriers are swung back and forth during a cycle. It is further possible to give both carriers of the same press different kinds of movements, so that one carrier has a continuous movement and the other an oscillating one.

The carriers may be rotated about the press columns or about separate trunnions supported on stationary parts of the press, such as its platen.

The invention is applicable to any type of press irrespective of whether it is a vertical or horizontal press or column-type or frame press. In the case of the invention being applied to a horizontal column-type press it is preferable to arrange one of the columns at the same horizontal level as the press axis and to mount the die carrier on this column; the bolster carrier may then be mounted on a column above that level.

The rotation of both carriers may be automatically controlled by such means as electric limit switches and the movements of the carriers may be interlocked with those of other press parts.

Rotation or oscillation of the carriers may be effected by electric motors through suitable reduction gears or by hydraulic cylinders and pistons.

It is sometimes necessary in extrusion presses to expel from the container of the press a billet or an unextruded portion thereof, for instance, when the billet is too cold. In order to make provision for this contingency in the press according to the invention, parts of the die- and bolster-assemblies are replaceable by apertured pieces whose openings are large enough to receive the billets or billet portions and which fill the gap between container and platen after withdrawal of the parts of the die- and bolster-assemblies.

Two separate die-assemblies may be provided on one end of the same carrier. Alternatively, one of the die-assemblies on this carrier may be replaced by a special tool such as the afore-mentioned apertured piece for the ejection of unextrudable billets or a closure plate for the container bore.

An embodiment of the invention will now be described in detail with reference to the accompanying drawings in which:

FIG. 1 is a top plan view of a part of an extrusion press, incorporating the invention.

FIG. 2 is an end view partly in section of that part, seen in the direction of the arrow A in FIG. 1.

FIG. 3 is a partial axial section, taken along line 3—3 of FIG. 1.

In the drawings there is shown a horizontal metal extrusion press having a massive platen 10 which is connected by three columns 11a, 11b, 11c to a main cylinder not shown. The container of the press is indicated at 12 in FIGS. 1 and 3 and the pressing stem at 13 in FIG. 1. The container can be shifted axially by means of cylinder-and-ram units not shown. The pressing stem 13 is operated by a main ram not shown which is displaceable in the main cylinder.

Co-operating in the well known manner with the container 12 and the pressing stem 13 in the extrusion of metal billets is a die assembly generally indicated by the numeral 14 and comprising a die proper 15 with a U-shaped die holder 16 and a first shearing plate 17 which backs the die holder. Arranged between the die assembly 14 and the platen 10 is a bolster assembly generally indicated by the numeral 18 and comprising a bolster proper 19 and a second shearing plate 20.

The die assembly 14 is mounted on a swinging arm 21 which can be rotated at its centre about the column 11a. The arm 21 carries at each end a die-assembly of which one—14—is shown in FIGS. 1 and 2 as being in the press axis whilst another die assembly 114 is shown at an outside station where a die can be exchanged or cleaned and reconditioned.

Rotation of the arm 21 by 180° causes the two die assemblies 14 and 114 to exchange their positions relative to the press axis. It will be noted in this connection that the three columns are so arranged relative to the axis that column 11a which constitutes a fulcrum for the arm 21 is in the horizontal plane through the press axis. Rotation of the arm 21 about the column 11a is effected through a pinion 22 and a spur wheel 23 by such means as a motor 24 FIG. 1. The die assemblies 14 and 114 together with the arm 21, can be moved parallel to the press axis by means of one or more hydraulic units not shown, in order to withdraw the die assembly which is in its operative position from the bolster assembly and/or the container.

The bolster assembly 18 is mounted at one end of an arm 25 which can be swung about the upper column 11b. A hydraulic cylinder 26 with piston 27 is provided for that purpose, the cylinder being hinged at 28 to a stationary bracket 29 and the piston rod 30 being hinged at 31 to the arm 25. The bolster assembly 18 can thus be moved from an operative position in which it is in alignment with one of the die assemblies to an outside station in which the bolster assembly is readily accessible so that it can be exchanged or reconditioned. The bolster assembly 18 is shown in FIG. 2 in full lines in its operative position and in chain lines in its outside position.

Inserted into the two shearing plates 17 and 20 are knives 32 and 33 respectively of circular or semi-circular shape which become operative upon relative displacement of the two plates such as occurs when either the arm 21 or 25 or both are rotated about the columns 11a and 11b respectively.

A motor-driven pendulum saw 34 is mounted on an arm 35 which can be swung about column 11b by means of a piston-and-cylinder unit 36 hinged at 37 to a stationary bracket 38.

Shearing of the discard after an extrusion operation can be carried out either by the saw 34 or by the knives 32 and 33. Means are further provided for sliding the arm 21 relative to the arm 25 in a direction parallel to the main press axis to make it possible for the saw 34 to enter between the two arms for discard-separating purposes.

It sometimes occurs that only part of a billet can be extruded whilst the rest remains in the container because it is too cold. The present invention makes it possible to remove the unextrudable portion of the billet from the press in the following manner.

The container 12 is first withdrawn, and the extruded portion severed from the unextruded portion by the saw 34. Thereupon a distance piece in the form of a horseshoe is attached to the arm 21, in place of a die assembly. The bolster assembly is then swung out and replaced by a special tool consisting of a ring whose opening is the size of the billet. This ring is swung into the press axis whereupon the container is moved back so as to abut against the aforementioned distance piece and the unextruded billet portion ejected.

I claim:

1. A horizontal metal extrusion press having a platen, a billet container with a billet chamber, an extrusion die adapted to be positioned alternatively at one end of said chamber and in alignment with the press axis and at an outside station at a distance from said press axis, said outside station being in the horizontal axial plane of the press, a bolster adapted to be positioned alternatively between die and platen and in alignment with the press axis and at an outside station at a distance from said press axis, said outside station being in the horizontal plane of the press but opposite to the outside station of said die, a first carrier supporting said die and movable for transferring said die from its position in the press axis to its outside station, and a second carrier supporting said bolster and movable for transferring said bolster from its position in the press axis to its outside station.

2. A horizontal metal extrusion press according to claim 1, in which said first carrier is an arm rotatable about an axis parallel to the press axis, and in which the outside station for the die is outside the confines of the press, and the outside station for the bolster is within the confines of the press.

3. A horizontal metal extrusion press according to claim 2 having three columns of which one is in the horizontal axial plane of the press while the other two are above and below said plane respectively, and in which said second carrier is rockable about the column above the horizontal plane of the press.

4. A horizontal metal extrusion press according to claim 2 in which the die carrier is slidable relative to said bolster in a direction parallel to the main longitudinal axis, and including shearing means adapted to shear an extrusion between said bolster and said die.

5. A horizontal metal extrusion press according to claim 4 in which said shearing means is a saw mounted on a pivotable arm which may engage the extrusion for cutting after said die carrier has been moved away from said bolster in the axial plane of the press.

6. A horizontal metal extrusion press according to claim 4 wherein said bolster and die holder have opposed shearing edges and shearing of an extrusion is accomplished by opposed relative rotational movement of said shearing edges.

References Cited in the file of this patent

UNITED STATES PATENTS

| 2,858,017 | Kent et al. | Oct. 28, 1958 |
| 2,896,782 | Billen | July 28, 1959 |

FOREIGN PATENTS

| 1,163,770 | France | Apr. 28, 1958 |